United States Patent [19]

Hayashi

[11] Patent Number: 5,363,410
[45] Date of Patent: Nov. 8, 1994

[54] MODULATION CIRCUIT FOR A DIGITAL RADIO COMMUNICATIONS APPARATUS USING A PHASE SHIFTED DQPSK MODULATION SYSTEM

[75] Inventor: Takahisa Hayashi, Tokyo, Japan

[73] Assignee: Kabushiki Kaisha Toshiba, Kawasaki, Japan

[21] Appl. No.: 888,028

[22] Filed: May 26, 1992

[30] Foreign Application Priority Data

May 27, 1991 [JP] Japan .................... 3-120842

[51] Int. Cl.$^5$ .................................... H03C 3/02
[52] U.S. Cl. ............................. 375/67; 375/39; 375/54; 375/56; 375/84; 329/304; 332/103
[58] Field of Search ............. 375/39, 42, 52–54, 375/56, 67, 80, 83–86; 329/304, 306, 345–346; 332/103, 145

[56] References Cited

U.S. PATENT DOCUMENTS 4,613,976  9/1986  Sewerinson et al. ............. 375/54
5,210,775  5/1993  Takahara et al. ............. 375/67

Primary Examiner—Stephen Chin
Assistant Examiner—Young Tse
Attorney, Agent, or Firm—Finnegan, Henderson Farabow, Garrett & Dunner

[57] ABSTRACT

A modulation circuit includes a mapping position detector as well as a circuit for differentially phase coding a plurality of separated data streams. The differentially phase coding circuit is adapted to differentially phase code the plurality of data streams for each pulse time and generate a coded signal containing amplitude information. The mapping position detector detects the phase mapping position of the coded signal based on the amplitude information in the coded signal which is output from the differentially phase coding circuit. Information representing the detected phase mapping position is supplied to the differentially phase coding circuit so as to achieve a differential phase coding at a pulse time following one pulse time.

4 Claims, 7 Drawing Sheets

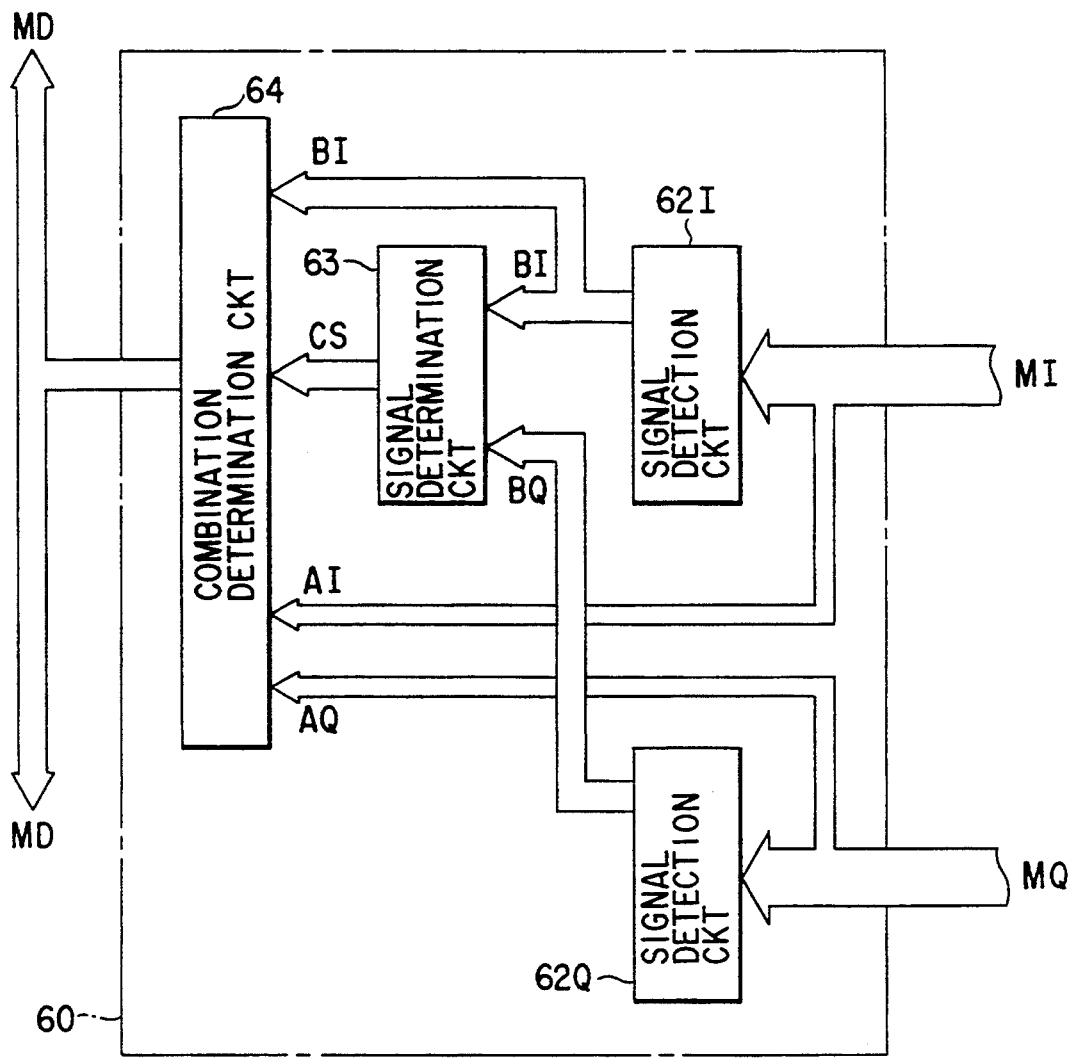
F I G. 3

| ROM ADDRESS | | | ROM OUTPUT | |
|---|---|---|---|---|
| MD | BBX' | BBY' | MI | MQ |
| 0 0 0 | 1 0 0 1<br>1 0 0 1<br>0 1 1 1<br>0 1 1 1 | 1 0 0 1<br>0 1 1 1<br>1 0 0 1<br>0 1 1 1 | 0 0 0 0<br>1 0 0 1<br>0 1 1 1<br>0 0 0 0 | 0 1 1 1<br>0 0 0 0<br>0 0 0 0<br>1 0 0 1 |
| 0 0 1 | 1 0 0 1<br>1 0 0 1<br>0 1 1 1<br>0 1 1 1 | 1 0 0 1<br>0 1 1 1<br>1 0 0 1<br>0 1 1 1 | 1 0 1 1<br>1 0 1 1<br>0 1 0 1<br>0 1 0 1 | 0 1 0 1<br>1 0 1 1<br>0 1 0 1<br>1 0 1 1 |
| 0 1 0 | 1 0 0 1<br>1 0 0 1<br>0 1 1 1<br>0 1 1 1 | 1 0 0 1<br>0 1 1 1<br>1 0 0 1<br>0 1 1 1 | 1 0 0 1<br>0 0 0 0<br>0 0 0 0<br>0 1 1 1 | 0 0 0 0<br>1 0 0 1<br>0 1 1 1<br>0 0 0 0 |
| 0 1 1 | 1 0 0 1<br>1 0 0 1<br>0 1 1 1<br>0 1 1 1 | 1 0 0 1<br>0 1 1 1<br>1 0 0 1<br>0 1 1 1 | 1 0 1 1<br>0 1 0 1<br>1 0 1 1<br>0 1 0 1 | 1 0 1 1<br>1 0 1 1<br>0 1 0 1<br>0 1 0 1 |
| 1 0 0 | 1 0 0 1<br>1 0 0 1<br>0 1 1 1<br>0 1 1 1 | 1 0 0 1<br>0 1 1 1<br>1 0 0 1<br>0 1 1 1 | 0 0 0 0<br>0 1 1 1<br>1 0 0 1<br>0 0 0 0 | 1 0 0 1<br>0 0 0 0<br>0 0 0 0<br>0 1 1 1 |
| 1 0 1 | 1 0 0 1<br>1 0 0 1<br>0 1 1 1<br>0 1 1 1 | 1 0 0 1<br>0 1 1 1<br>1 0 0 1<br>0 1 1 1 | 0 1 0 1<br>0 1 0 1<br>1 0 1 1<br>1 0 1 1 | 1 0 1 1<br>0 1 0 1<br>1 0 1 1<br>0 1 0 1 |
| 1 1 0 | 1 0 0 1<br>1 0 0 1<br>0 1 1 1<br>0 1 1 1 | 1 0 0 1<br>0 1 1 1<br>1 0 0 1<br>0 1 1 1 | 0 1 1 1<br>0 0 0 0<br>0 0 0 0<br>1 0 0 1 | 0 0 0 0<br>0 1 1 1<br>1 0 0 1<br>0 0 0 0 |
| 1 1 1 | 1 0 0 1<br>1 0 0 1<br>0 1 1 1<br>0 1 1 1 | 1 0 0 1<br>0 1 1 1<br>1 0 0 1<br>0 1 1 1 | 0 1 0 1<br>1 0 1 1<br>0 1 0 1<br>1 0 1 1 | 0 1 0 1<br>0 1 0 1<br>1 0 1 1<br>1 0 1 1 |

FIG. 4

| CS | 0 | | | | 1 | | | |
|----|---|---|---|---|---|---|---|---|
| BI | 0 | | 1 | | X | | | |
| AI | X | | 1 (−) | 0(+) | 0 (+) | | 1 (−) | |
| AQ | 1 (−) | 0(+) | X | X | 0(+) | 1 (−) | 0(+) | 1 (−) |
| MD | G | E | F | H | A | D | B | C |

FIG. 5

| Xk | Yk | Δϕ |
|----|----|-----|
| 1 | 1 | $\frac{-3\pi}{4}$ |
| 0 | 1 | $\frac{3\pi}{4}$ |
| 0 | 0 | $\frac{\pi}{4}$ |
| 1 | 0 | $\frac{-\pi}{4}$ |

MODULATION CIRCUIT FOR A DIGITAL RADIO COMMUNICATIONS APPARATUS USING A PHASE SHIFTED DQPSK MODULATION SYSTEM

BACKGROUND OF THE INVENTION

1. Field of the Invention

The present invention relates to a modulation circuit for use in a digital radio communications apparatus, such as a digital portable telephone apparatus, a digital automobile telephone apparatus and a digital cordless telephone apparatus and, in particular, to a modulation circuit using a phase shifted DQPSK modulation system as a modulation system.

2. Description of the Related Art

Recently, proposals has been advanced to adopt a digital apparatus as one of radio telephone systems. This type of system can transmit not only a control signal between a mobile station and a a base station but also communication items, such as a tone of speech, in a digital form. This system is of advantage in that it can achieve improved privacy, improved compatibility with data, effective utilization of a radio frequency, etc.

A digital radio communications equipment in this type of system uses, as one modulation system for example, a $\pi/4$ shifted DQPSK ($\pi/4$ shifted, differentially encoded quadrature phase shift keying) modulation system. In a modulation circuit using this type of $\pi/4$ shifted DQPSK modulation system, a transmit data stream is converted by a serial/parallel converter into two data streams $X_k$, $Y_k$. These data streams $x_k$ and $Y_k$ are differentially phase coded, by a differentially coded mapping circuit, to a form as given below:

$$I_k = I_{k-1} \cos[\Delta\phi(X_k, Y_k)] - Q_{k-1} \sin[\Delta\phi(X_k, Y_k)]$$

$$Q_k = I_{k-1} \sin[\Delta\phi(X_k, Y_k)] + Q_{k-1} \cos[\Delta\phi(X_k, Y_k)]$$

where $I_{k-1}$, $Q_{k-1}$ denote the amplitudes of coded data at a pulse time corresponding to one-previous pulse time, and $\Delta\phi$ denotes an amount of phase change.

FIG. 7 shows a relation of input data streams $x_k$, $Y_k$ to $\Delta\phi$ and FIG. 8 shows a phase space diagram representing the phase mapping positions of coded data $I_k$, $Q_k$ output from the differentially phase coded mapping circuit.

That is, the differentially coded mapping circuit determines the phase matching position of the coded data $I_k$, $Q_k$ at each pulse time on the basis of the signal levels ("1", "0") of the input data streams $X_k$, $Y_k$ and the phase mapping position of the coded data $I_{k-1}$, $Q_{k-1}$ at the pulse time corresponding to one-previous pulse time. At each pulse time, any of the positions as indicated by "○" and any of the positions "◇" in FIG. 8 are alternately selected on the phase mapping position. Further, it is possible to selectively take, as the amplitude value of the coded data $I_k$, $Q_k$, one of five values: 0, $\pm 1$, $\pm 2^{\frac{1}{2}}$ ($\sqrt{2}$).

The use of such $\pi/4$ shifted DQPSK modulation system can suppress the spreading of a signal band involved.

However, no practical modulation circuit-incorporated arrangement has yet been achieved.

SUMMARY OF THE INVENTION

It is accordingly the object of the present invention to provide a modulation circuit for a digital radio communications apparatus which has a novel arrangement for differential coding mapping.

Another object of the present invention is to provide a modulation circuit which can positively detect a phase mapping position from differential coding data contained in amplitude information.

Another object of the present invention is to provide a modulation circuit which can variably set an amplitude value of a modulation signal simultaneously with differential coding mapping.

According to the present invention, a modulation circuit as will be set out below is provided in order to achieve the aforementioned object. That is, the modulation circuit includes not only a mapping position detector but also a differentially coded mapping circuit adapted to differentially coding a plurality of separated data streams which are output from a serial/parallel conversion circuit. The mapping circuit is of such a type as to differentially code the plurality of data streams at each pulse time and to output a coded signal containing amplitude information. Based on the amplitude information in the differentially coded data delivered as an output from the mapping circuit, the mapping position detector detects the mapping position of the differentially coded data. The information representing the detected phase mapping position is supplied to the mapping circuit so as to achieve differentially phase coding at a pulse time following one pulse time.

The feature of the present invention lies in that the differentially coding mapping circuit is adapted to deliver, as an output, differentially coded data containing amplitude information and that, based on the amplitude information in the differential coded data delivered from the mapping circuit, the mapping position detector detects the phase mapping position of the differentially coded data so that a result of detection is fed back to the mapping circuit to achieve differentially phase coding at a pulse time following one pulse time.

According to the present invention, even if the mapping circuit is adapted to deliver, as an output, differentially coded data in the amplitude information, the phase mapping position of the differentially coded data is detected based on the amplitude information in the differentially coded data delivered from the mapping circuit and a result of detection can be fed back to the mapping circuit. To put it in another way, according to the present invention, a differentially coded mapping circuit can be so configured as to output differentially coded data containing amplitude information.

In order to achieve another object of the present invention, the mapping position detector can be configured as will be set out below. That is, a first determining unit determines the polarity of an amplitude from amplitude information in differentially coded data deliverd as an output from the differentially coded mapping circuit; a second determining unit is responsive to the amplitude information in the differentially coded data for determining whether the phase mapping position is on a reference coordinate axis or on a position between the reference coordinate axes; a third determining unit is responsive to the amplitude information in the differentially coded data for determining whether or not the phase mapping position is on an in-phase position or on a quadrature axis on the reference coordinates; and a fourth determining unit detects the phase mapping position of the coded signal through a selective use of at least two of results of determination by the first, second and third determining units and supplies the information of the detected phase mapping position to the mapping circuit so as to achieve the differential phase coding at a pulse time following one pulse time.

According to the present invention, therefore, even if the differentially coded data contains amplitude information or a variation occurs in the value of an amplitude represented by the amplitude information, it is possible to accurately detect the phase mapping position of the differentially coded data at all times.

In order to achieve still another object of the present invention, the mapping unit has a plurality of memory units initially storing a plurality of differentially coded data on the same mapping position but different amplitude values and allows differentially coded data of a predetermined amplitude value to be read as an output from the selected memory circuit.

By so doing, it is possible to variably set the amplitude value of the modulation signal simultaneously with the differentially coding mapping.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 is a block circuit diagram showing an arrangement of a mapping position detector in FIG. 2;

FIG. 4 is a diagram showing an input/output correspondence relation of a differentially coded mapping circuit in the digital modification circuit in FIG. 2;

FIG. 5 is a view showing an input/output correspondence relation of a combination determination circuit in the mapping position detector in FIG. 3;

DETAILED DESCRIPTION OF THE PREFERRED EMBODIMENTS

One embodiment of the present invention will be explained below by referring to the accompanying drawings.

Figure 1:
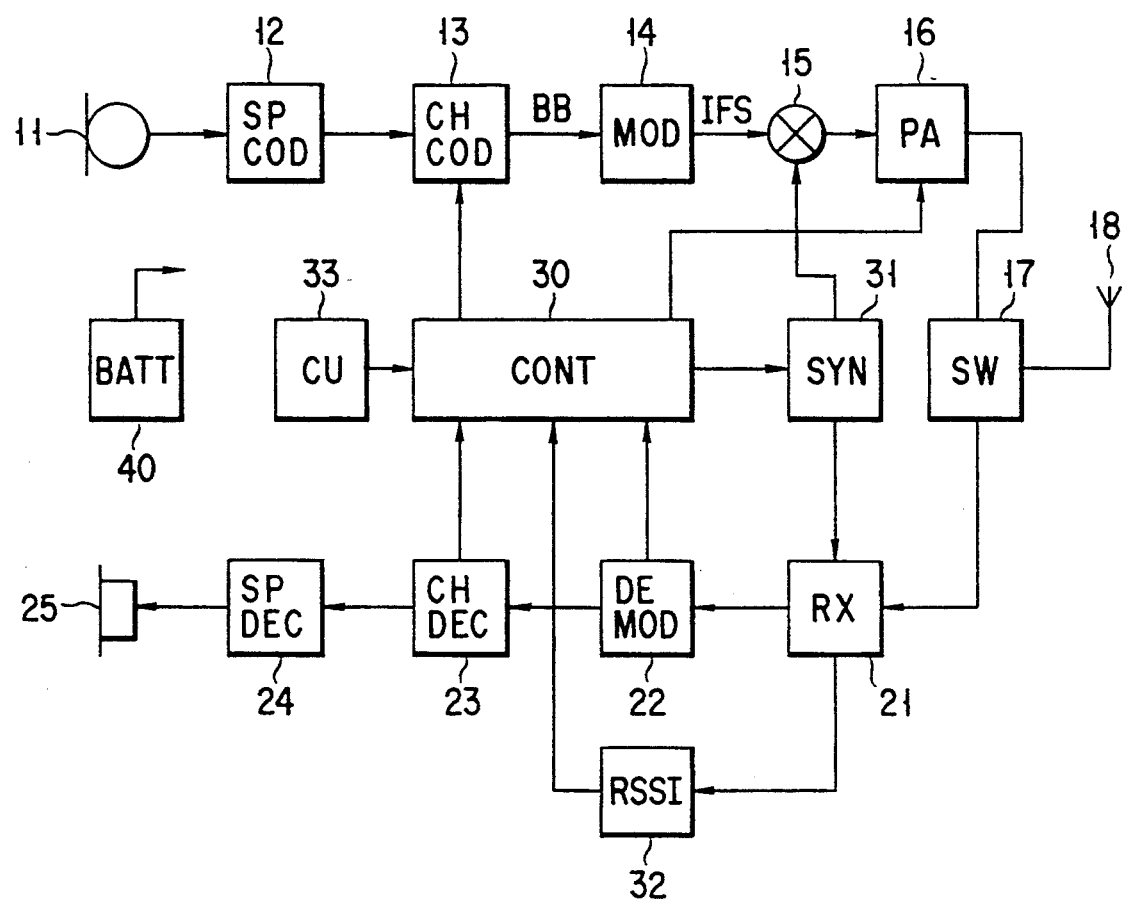
FIG. 1 is a block circuit diagram generally showing a digital radio communications equipment according to one embodiment of the present invention.

FIG. 1 is a block circuit diagram showing an arrangement of a digital radio communications equipment equipped with a modification circuit according to an embodiment of the present invention.

The equipment is broadly divided into a transmitting system, a receiving system and a control system. In FIG. 1, reference numeral 40 shows a power source circuit using batteries as a power source.

First, the transmitting system comprises a microphone 11, a speech coder 12, a channel correction coder 13, a digital modulator 14, a mixer 15, a power amplifier 16, a high-frequency switch circuit 17 and an antenna 18. The speech coder 12 codes a speech signal sent from a microphone 11. The channel correction coder 13 performs an error code correction coding of a coded speech signal sent from the speech coder 12 and a control signal delivered from a controller 30. An output of the channel correction coder 13 is transmitted as error-corrected coded data BB to the digital modulator 14 where processing is made, by a $\pi/4$ shifted DQPSK modulation system, for modulating a transmit intermediate frequency signal with the error-corrected coded data thus transmitted. The output of the modulator circuit is supplied to the mixer 15 where the modulation intermediate frequency signal coming from the digital modulator 14 is mixed with a local oscillation signal coming from a frequency synthesizer 31 to frequency convert it to a high frequency signal. A radio transmit signal produced from the mixer is supplied to the power amplifier 16 where it is amplified to a predetermined transmit power. The output of the power amplifier is fed through a high frequency switch 17 to the antenna 18. The radio transmit signal is transmitted as a burst transmit mode from the antenna 18 toward a base station, not shown.

The receiving system comprises a receiver 21, a digital demodulator 22, an error correction decoder 23, a speech decoder 24 and a speaker 25. In the receiver 21, the radio signal received by the antenna and switch 17 is frequency converted in a predetermined radio frequency receive time slot. The output of the receiver 21 is sent as a receive signal to the digital demodulator where, after being bit-and frame-synchronized, it is digitally demodulated. The output of the digital demodulator 22 is supplied to the error correction decoder 23 where it is error correction decoded. It is to be noted that, in this case, a digital receive signal and digital control signal are output from the error correction decoder 23. Of these signals, the digital receive signal is input to the speech decoder 24 and the digital control signal is input to the controller 30. The speech decoder 24 performs decode processing on the digital receive signal. An analog receive signal obtained through the decode processing is output from the speaker 25.

The control system comprises the controller 30, the frequency synthesizer 31, a receive field intensity detector 32 and a console unit 33. Of these, the frequency synthesizer 31 produces transmit and receive local oscillation signals corresponding to radio channel frequencies designated by the controller 30. The receive field intensity detector 32 detects the receive field intensity of a radio signal wave coming from the base station. The detected signal is informed to the controller 30 for idle channel search and for out-of-communication surveillance. The console unit 33 includes a dial key, switches such as a transmit switch, and display units such as a liquid crystal display device (LCD) and a light emitting diode (LED).

Figure 2:
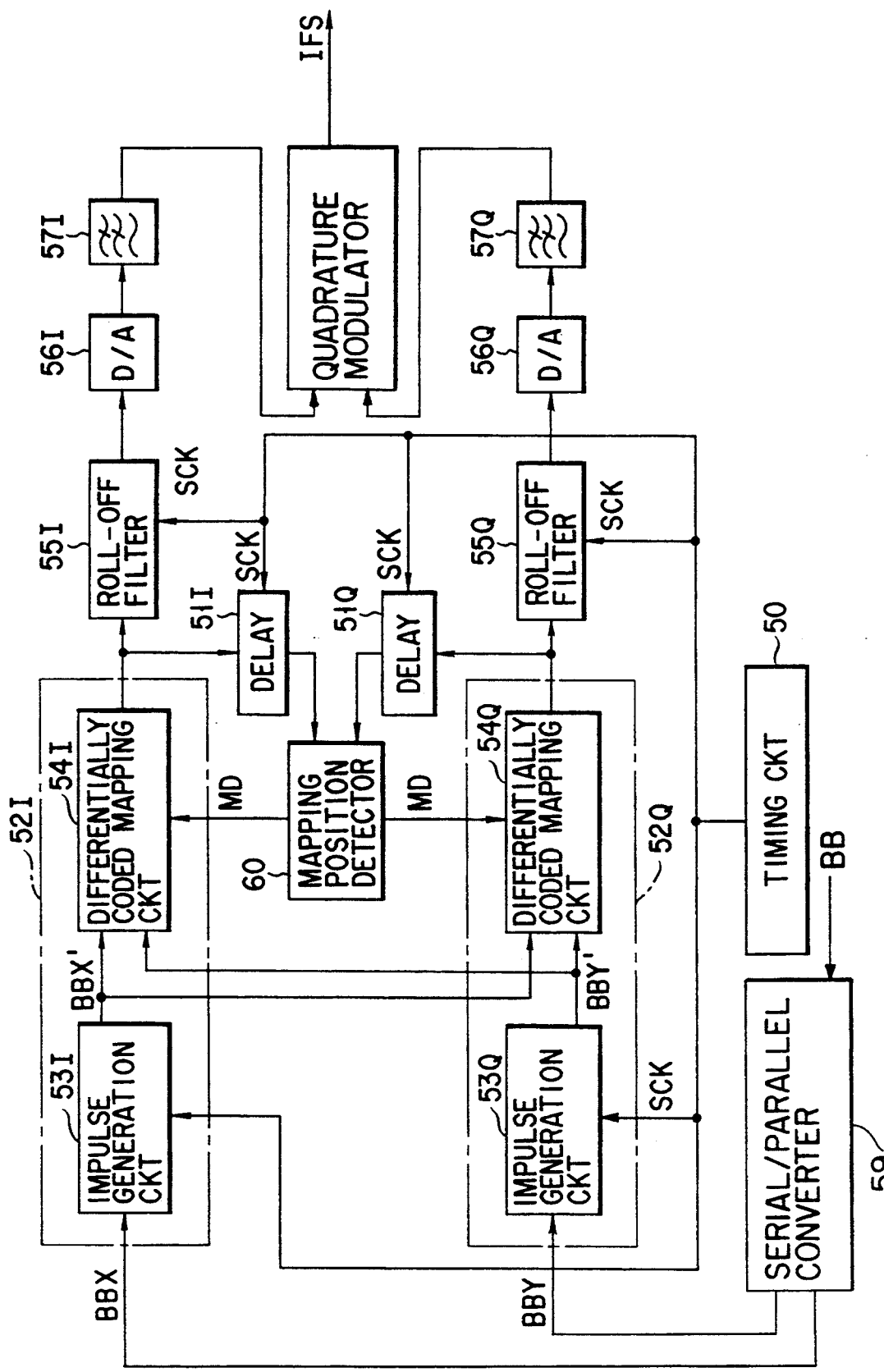
FIG. 2 is a block circuit diagram showing an arrangement of a digital modulation circuit in the equipment shown in FIG. 1.

FIG. 2 is a block circuit diagram showing an arrangement of the digital modulator 14. The transmission data BB delivered from the coder 13 is input to mapping circuits 52I and 52Q after being serial/parallel converted into two separated transmit data BBX and BBY by a serial/parallel converter 59. The mapping circuits 52I and 54Q are such that the circuit 52I includes an impulse generation circuit 53I and a differentially coded mapping circuit 54I and the mapping circuit 52Q includes an impulse generation circuit 53Q and a differentially coded mapping circuit 54Q.

The impulse generation circuits 53I and 53Q convert the input transmit data BBX and BBY to corresponding impulse signals.

The differentially coded mapping circuits 54I and 54Q are constructed of a ROM in a practical circuit. These ROMs 54I and 54Q initially store differential phase coded data MI and MQ corresponding to their respective addresses. The respective addresses comprise the impulse-generated transmit data BBX' and BBY' and mapping position detection data MD coming from a mapping position detector 60 as will be set out below. When the addressing information comprised of the transmit data BBX' and BBY' and mapping position detection data MD is input to the differentially coded mapping circuits 54I and 54Q, then the mapping circuits 54I and 54Q produce the transmit data BBX' and BBY', as π/4 shifted differential phase coded data, based on the mapping position detection data MD. FIG. 4 shows one form of an address/memory content correspondence relation at the mapping circuits 54I and 54Q (ROMs).

The differentially coded data MI and MQ coming from the mapping circuits 54I and 54Q have their out-of-transmission band noises eliminated by respective roll-off filters 55I and 55Q. The transmit data supplied from the roll-off filters 55I and 55Q, after being converted by D/A converters 56I and 56Q to analog signals, are input to a quadrature modulator 58 through the low-pass filters 57I and 57Q. The transmit intermediate frequency signal is quadrature PSK modulated based on the input signal. The QPSK modulated transmit intermediate frequency IFS is supplied to the mixer 15 for frequency conversion as shown in FIG. 1.

The mapping position detector 60 are provided in the digital modulator 14 of the present embodiment. The differentially coded data MI and MQ coming from the mapping circuits 54I and 54Q are input to the mapping position detector 60 through delay circuits 51I and 51Q. FIG. 3 shows an arrangement of the mapping position detector 60. The detector 60 comprises signal detectors 62I and 62Q, a signal determination circuit 63 and a combination determination circuit 64. Of the differentially coded data MI and MQ, bits representing their amplitude values are input as amplitude data to signal detection circuits 62I and 62Q. Of the differentially coded data, bits representing their polarities are input as polarity data AI and AQ to the combination determination circuit 64.

The signal detection circuits 62I and 62Q is responsive to the input amplitude data for detecting the presence or absence of a signal involved. The detected data BI and BQ are input to the signal determination circuit 63. Based on detection data BI and BQ representing the presence or absence of the signal, the signal determination circuit 63 determines whether the differentially coded data MI and MQ coming from the mapping circuits 54I and 54Q are on a normal phase position as indicated by A to D in FIG. 8 or on a π/4 shifte-phase position as indicated by E to H in FIG. 8. The result of determination, CS, is input to the combination determination circuit 64.

The combination determination circuit 64 is constructed of a ROM. The mapping position detection data MD is initially stored in ROM above in a relation corresponding to the respective address. The respective address is comprised of the polarity data AI, AQ, detection data BI representing the presence or absence of the signal from the signal detection circuit 62I, and the result of determination, CS, coming from the signal determination circuit 63. When addressing information comprising the polarity data AI, AQ, detected data BI representing the presence or absence of the signal supplied from the signal detection circuit 62I and the result of determination, CS, supplied from the signal determination circuit 63, is input to the combination determination circuit 64, then the data MD representing the mapping position of the differentially coded data MI, MQ is read out from the combination determination circuit 64. The mapping position detection data MD is supplied to the mapping circuits 54I and 54Q (FIG. 2) for mapping at the next pulse time.

Figures 7, 8:
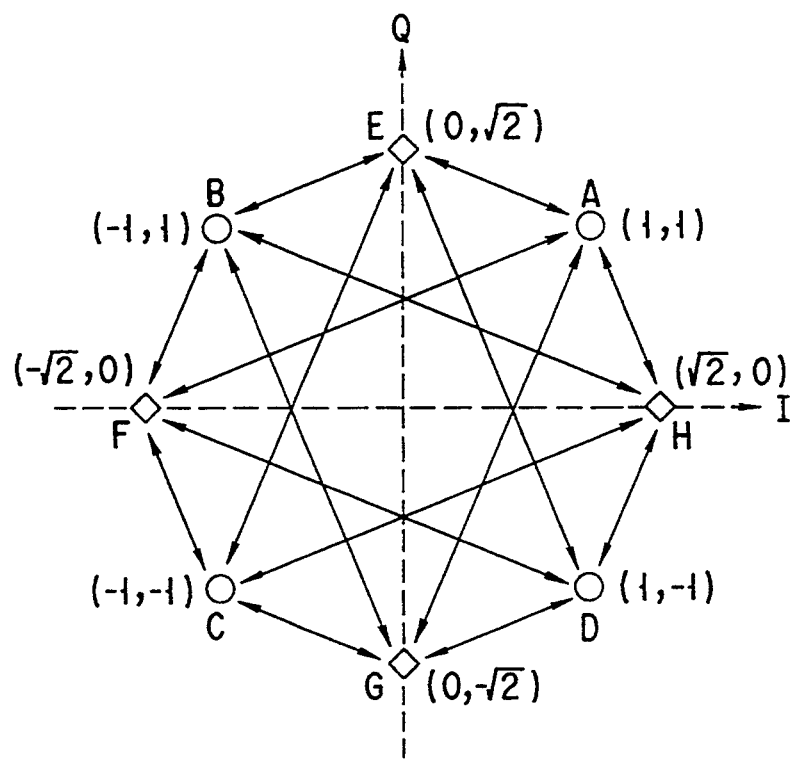
FIG. 7 is a view showing a relation between input digital signals $X_k$, $Y_k$ in a $\pi/4$ shifted DQPSK modulation system and a phase variation $\Delta\phi$.
FIG. 8 is a view showing a mapping position in the $\pi/4$ shifted DQPSK modulation system.

FIG. 5 shows a correspondence relation between the respective input data AI, AQ, BI, in the combination determination circuit 64 and the mapping detection data MD. In FIG. 5, the "0" in CS represents a state corresponding to the phase position in which the mapping data MI, MQ are π/4 shifted. The "1" in CS represents a state corresponding to a normal phase position. Similarly, "0" in BI denotes a state corresponding to no signal state on an I axis and "1" denotes a state in which there is a signal present. Further, the "0" in AI, AQ shows a state corresponding to a positive state and the "1" shows a state corresponding to a negative state. The A to H of the mapping detection signal MD correspond to the respective phase positions as shown in FIG. 8 and the symbol X represents an indefinite state.

Figure 6:
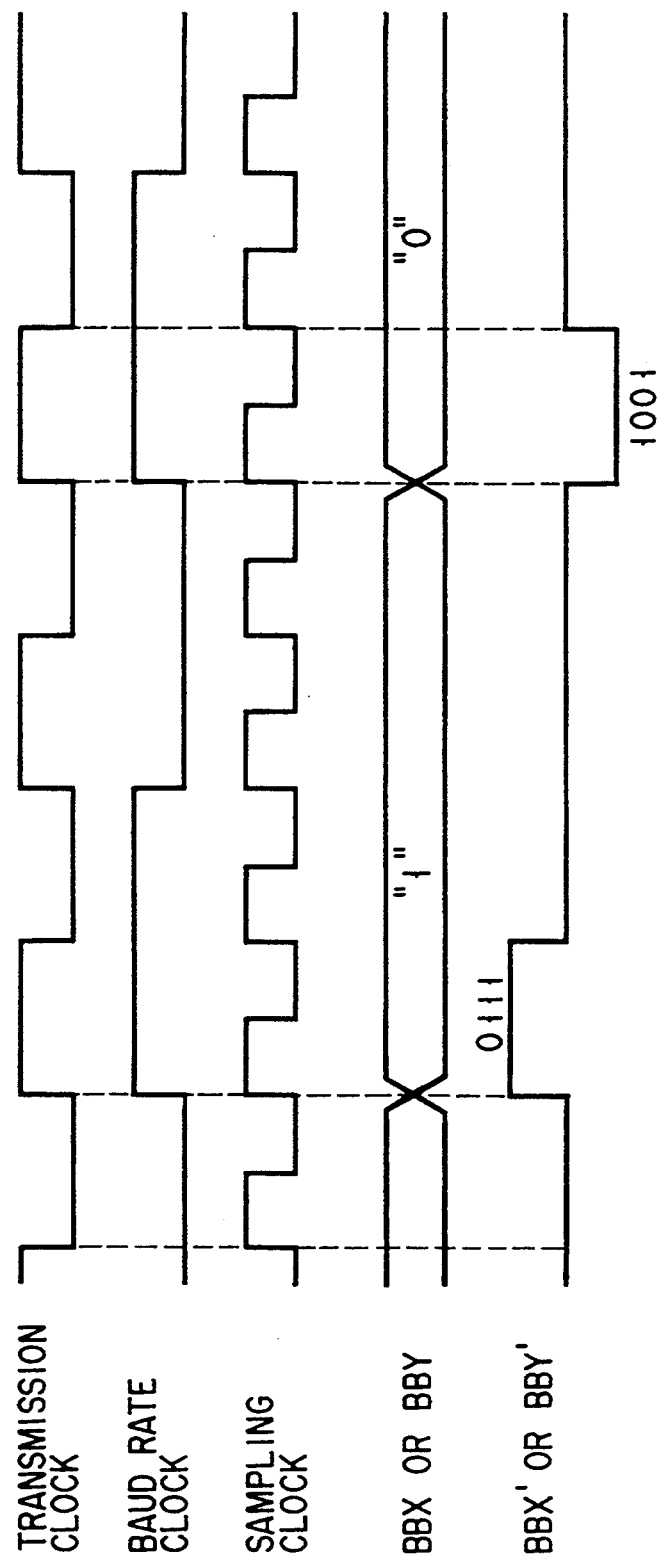
FIG. 6 is a timing diagram showing the timing of a clock for use in the digital modulation circuit in FIG. 2.

A timing circuit 50 supplies a cock SCK to the impulse generation circuits 53I, 53Q, delay circuits 51I, 51Q and roll-off filters 55I, 55Q. As the clock, use is made of the same clock as the sampling clock for use in the sampling of a baseband transmit signal at the preceding stage of the digital modulator 14. In the π/4 shifted DQPSK modulation system, one symbol of the baseband transmit signal is represented by 2 bits and a band rate clock frequency becomes one half the transmit clock frequency. In the case where, for example, one symbol of the baseband transmit signal is sampled four times, the frequency of the sampling clock becomes four times as great as the band rate clock frequency. At this time, the relation among the transmit clock, band rate clock and sampling clock are indicated by a timing diagram as shown in FIG. 6. In FIG. 6 is shown one example of the transmit data BBX, BBY prior to being input to the impulse generation circuits 53I, 53Q and the transmit data BBX', BBY' subsequent to being generated as an impulse. The impulse transmit data BBX', BBY' are produced only during a one-cycle period of the sampling clock.

The operation of the digital modulator 14 thus arranged will be set forth below.

Let it be assumed that, in any pulse time, differentially coded transmit data MI, MQ are output from the mapping circuit 54I, 54Q. Then the transmit data MI, MQ are sent through the roll-off filters 55I, 55Q, D/A converters 56I, 56Q to low-pass filters 57I, 57Q and, as analog signals, from there to the quadrature modulator 58 where an intermediate frequency signal is QPSK modulated by the analog transmit signal. The modulated intermediate frequency signal, after being frequency converted by the mixer 15 to a radio frequency, is sent through the power amplifier 16 and high-frequency switch 17 to the antenna 18 where it is transmitted to a base station.

On the other hand, the transmit data MI, MQ are supplied to the delay circuits 51I, 51Q to impart a delay corresponding to one symbol to the transmit data MI, MQ and from there to the mapping position detector 60. In the mapping position detector 60, the signal detecting circuits 62I, 62Q each detect the presence or absence of a signal on the basis of bits representing the amplitude value in the corresponding differentially coded transmit data (MI, MQ). Based on the results of detection by the signal detection circuits 62I, 62Q, the signal determination circuit 63 determines whether the transmit data MI, MQ are on the normal phase position or on the π/4 shifted phase position.

Let it be assumed that, for example, the mapping positions represented by the differentially coded transmit data MI, MQ correspond to any of the phase positions A to D in FIG. 6. In this case, the signal detection circuits 62I, 62Q each produce, as a detection signal, a "0" output indicating the presence of a signal involved. Based on the detection signal, the signal determination circuit 63 determines that the mapping position corresponds to the normal phase positions "◯". On the other hand, let it be assumed that the mapping position corresponds to any of the phase positions E to H in FIG. 8. In this case, an output "0" representing the presence of a signal involved is produced from only one of the signal detection circuit 63. Based on the detection signal, the signal determination circuit 63 determines that the mapping position corresponds to any of the π/4 shifted phase positions " ◇ " in FIG. 8.

When the phase position CS is determined by the signal determination circuit 63, then based on the result of determination, CS, at the phase position, result of detection, BI, at the signal detection circuit 62I and polarity data AI, AQ at the mapping position, the combination determination circuit 64 detects the mapping position MD in accordance with a correspondence relation shown in FIG. 5.

For example, let it be assumed that the result of determination, CS, at the phase position is "1" corresponds to the normal phase position "◯" with the polarity data AI, AQ both representing a positive polarity "0". Then the combination determination circuit 64 identifies the mapping position at that time as being "A". When, on the other hand, the result of determination, CS, at the phase position is "0" representing the π/4 shifted phase position " " and the result of determination, BI, at the signal detection circuit 62I is "1" representing the presence of a signal involved with the polarity data AI representing a negative polarity "1", then the combination determination circuit 64 identifies the mapping position as being "F". In this way, the other mapping positions can be identified in a similar way.

The detection data MD on the mapping positions thus obtained are supplied to the mapping circuits 54I and 54Q so that the data MD are used for the differential coding of the baseband signal for the next pulse time.

Assume that, for example, the respective mapping positions A, E, B, F, C, G, D and H represent "000", "001", "010", "011", "100", "101", "110" and "111", that the amplitude values +1, −1 of the mapping positions A to D represent "0101" and "1011", and that the amplitude values 0, +√2 and −√2 on the mapping positions E to H represent "0000", "0111" and "1001".

Now suppose that, at a given pulse time t1, the mapping circuits 54I and 54Q receive bits (1001) and (1001) representing, for example, "0" and "0", as the impulse transmit data BBX' and BBY', from the impulse generation circuits 53I and 53Q and bits (000) representing "A", as the mapping position detection data MD corresponding to one pulse-previous differentially coded data MI and MQ, from the mapping position detection 60. Then the bits (0000) and (0111) representing amplitude values 0 and +√2 are read, as the transmit data MI and MQ, from the mapping circuits 54I and 54Q in accordance with the memory contents of ROM in FIG. 4.

Then the transmit data MI (0000) and MQ (0111) are delivered as outputs, and then the mapping position detector is so operated that, for a differential coding mapping at the next pulse time t2, it detects the mapping position as being E (in FIG. 8) on the basis of the differentially coded transmit data MI (0000) and MQ (0111). At the next pulse time t2, the bits (001) representing that mapping position E are output as mapping position detection data.

Suppose that, at the pulse time t2, bits (1001) and (0111) representing, for example, "0" and "1" are input, as impulse transmit data BBX' and BBY', from the impulse generation circuits 53I and 53Q to the mapping circuits 54I and 54Q.

By so doing, bits (1011) and (1011) representing amplitude values −1 and −1 are read, as the differentially coded transmit data MI and MQ, from the mapping circuits 54I and 54Q.

Subsequently, each time the transmit data MI and MQ are output from the mapping circuits 54I and 54Q, the mapping position detector 60 detects the mapping position based on the transmit data MI and MQ. Each time the impulse transmit data BBX' and BBY' are output from the impulse generation circuits 53I and 53Q, the mapping circuits 54I and 54Q enables the transmit data BBX' and BBY' to be subjected to a differential phase convertion in accordance with the mapping position detection data MD delivered from the mapping position detector 60.

In this embodiment, the mapping position detector 60 is provided whereby the mapping position is detected based on the amplitude information on the aforementioned transmit data MI and MQ so that, for the differential phase coding at the next pulse time, the detected data MD are supplied to the mapping circuits 54I and 54Q. Even when the differentially coded transmit data MI and MQ containing the amplitude information are output from the mapping circuits 54I and 54Q, the mapping position can accurately be detected at all times through the use of the transmit data MI and MQ. By the arrangement as set out below, it is possible to set the transmit data MI and MQ on the mapping circuits 54I and 54Q at any given variable amplitude values. For this reason, for example, the input values of the transmit signals to the quadrature modulator 58 can variably be adjusted by making the amplitude values of the differentially coded transmit data MI and MQ variable.

The present invention is not restricted to the aforementioned embodiment. Although, in the aforementioned embodiment, the differentially coded transmit data MI and MQ whose amplitude values are initially set to one value have been explained as being output from the mapping circuits 54I and 54Q in accordance with the aforementioned transmit data BBX' and BBY' and mapping position detection data MD. For example, the mapping circuits 54I and 54Q may be of such a type as to selectively produce a plurality of differentially coded transmit data (MI, MQ) whose amplitude values are different. This can be achieved by such a modulator as will be set out below.

A plurality of ROMs are provided for the differentially coded mapping circuits 54I and 54Q. One of these ROMs is selected by a corresponding select control signal of the controller 30, so that the selected ROM enables the readout of the differentially coded transmit data MI, MQ. By performing an operation for updating the amplitude value of a modulation signal by a switch in, for example, the console unit 33, a ROM select control signal is output from the control circuit 30 so that a corresponding one ROM is selected with that control signal. The selected ROM only is placed in a state to read out differentially coded transmit data MI and MQ.

In this way, the selection of one of the plurality of ROMs in the differentially coded mapping circuits 54I and 54Q enables a modulation signal which is input to the quadrature modulator 58 to be set to a variable amplitude value as required.

Although, in the aforementioned embodiment, the mapping position has been explained as being detected using the data BI detected from the differentially coded transmit data MI, it may be possible to detect a mapping position using data BQ detected from a differentially coded transmit data MQ.

Although, in the aforementioned embodiment, by way of examples, the invention has been explained in connection with the 4/$\pi$ shifted differential coding scheme, it may be possible to apply those differential coding schemes using a proper amount of shift to the present invention. Although, in the aforementioned embodiment, an explanation has been made, by way of example, about a digital radio apparatus for a digital automobile radio telephone system, the present invention may be applied to a digital cordless telephone apparatus and other digital mobile radio communications equipment.

Further, the means for determining the polarity of the mapping position, the means for determining whether the mapping position is on a normal phase position or on a position phase-shifted in a given amount, the means for determining the mapping position on an in-phase axis or on a quadrature position, the means for identifying the mapping position in accordance with a result of determination, etc., can be changed or modified in various ways without departing from the spirit and scope of the present invention.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A modulation circuit for a digital radio communications equipment comprising:
    serial/parallel converting means for converting a transmit data stream into a plurality of separated data streams;
    mapping means for allowing the plurality of separated data streams which are output from said serial/parallel converting means to be differentially phase coded at their respective pulse time upon reference to a result of a differential phase coding at a pulse time corresponding to one previous pulse time and for outputting differentially coded signal containing amplitude information;
    filtering means for filtering the differentially coded signal which is output from said mapping means and for outputting a modulation signal corresponding to the differentially coded signal;
    modulating means for PSK (phase shift keying) modulating a transmit local oscillation signal on the basis of the modulation signal which is output from said filtering means; and
    mapping position detecting means for detecting a phase mapping position on the differentially coded signal, which is output from said mapping means at the respective pulse time, on the basis of the amplitude information contained in the differentially coded signal and for supplying that information representing the detected phase mapping position to said mapping means so as to achieve the differentially phase coding at that pulse time following one pulse time.

2. The modulation circuit according to claim 1, wherein said mapping position detecting means includes:
    first determining means for determining amplitude polarity from the amplitude information in the differentially coded signal which is output from the mapping means;
    second determining means, responsive to the amplitude information in the differentially coded signal, for determining whether the phase mapping position is on a reference coordinate axis or on a position between the reference coordinate axes;
    third determining means, responsive to the amplitude information in the differentially coded signal, for determining whether the phase mapping position is on an in-phase position or on a quadrature axis on the reference coordinates; and
    fourth determining means for detecting the phase mapping position on the differentially coded signal through a selective use of at least two of results of determination by the first, second and third determining means and for supplying the information representing the detected phase mapping position to the mapping means so as to achieve the differential phase coding in the pulse time following one pulse time.

3. The modulation circuit according to claim 1, wherein the mapping means includes memory means for initially storing one set of differentially coded signal obtained by differentially phase coding the plurality of separated data stream upon reference to detection information on the mapping position delivered as an output from the mapping position detecting means and allows address information which is comprised of the plurality of separated data streams and detection information on the mapping position to be sent to the memory means and corresponding differentially coded signal to be selectively read, as an output, from the memory means.

4. The modulation circuit according to claim 1, wherein the mapping means has a plurality of memory means initially storing a plurality of differentially coded signal on the same phase mapping position but different amplitude values and allows differentially coded signal of a predetermined amplitude value to be read as an output from the selected memory means through a selection of one of the memory means.

* * * * *